Figure 1:
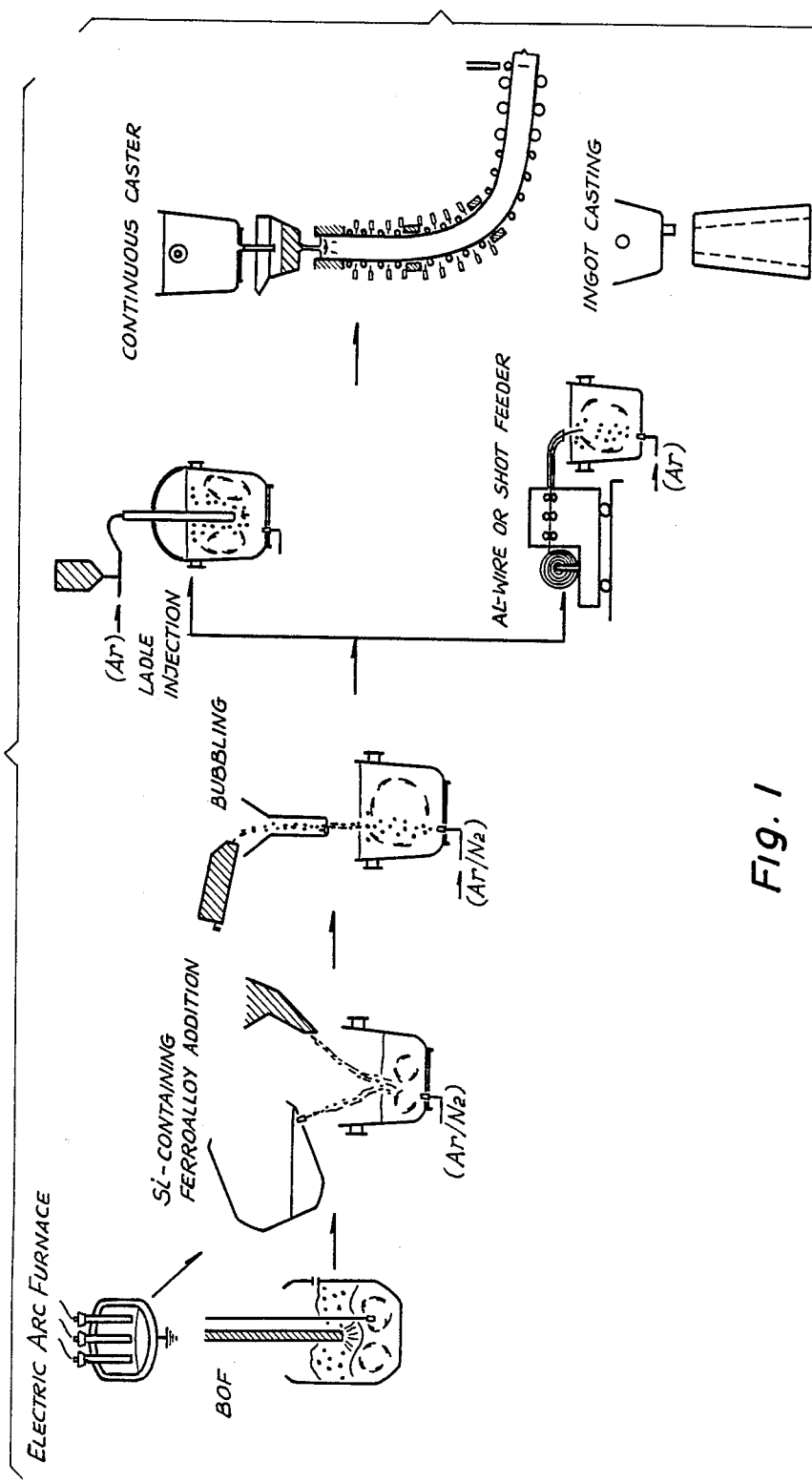

United States Patent [19]

Maw-Cheng et al.

[11] Patent Number: 4,741,772
[45] Date of Patent: May 3, 1988

[54] SI CONTAINED FERROALLOY ADDITION AS A WEAK PRE-DEOXIDATION PROCESS IN STEELMAKING

[75] Inventors: Shieh Maw-Cheng, Taipei; Chen Seng-Jung, Kaohsiung; Hu Li-Jung, Kaohsiung; Su Jin-Luh, Kaohsiung, all of Taiwan

[73] Assignee: China Steel Corporation, Taiwan

[21] Appl. No.: 608,151

[22] Filed: May 8, 1984

[51] Int. Cl.$^4$ .............................................. C21C 7/02
[52] U.S. Cl. ........................................... 75/58; 75/53
[58] Field of Search ................. 75/53, 58, 129, 130 R

[56] References Cited

U.S. PATENT DOCUMENTS

| 2,705,196 | 3/1955 | Wever | 75/58 |
|---|---|---|---|
| 2,819,503 | 1/1958 | Boucek | 75/58 |
| 2,836,489 | 5/1958 | Henke | 75/58 |
| 3,055,753 | 9/1962 | Matuschkovitz | 75/58 |
| 3,189,956 | 6/1965 | Longden | 75/58 |

FOREIGN PATENT DOCUMENTS

| 8298 | 7/1933 | Australia . |
|---|---|---|
| 11638 | 1/1934 | Australia . |
| 108976 | 11/1936 | Australia . |
| 101086 | 5/1937 | Australia . |
| 118501 | 2/1945 | Australia . |
| 280973 | 12/1964 | Australia . |
| 0002929 | 11/1979 | |

OTHER PUBLICATIONS

Metals Hand Book, vol. 4, Eight Edition, "Forming".

Primary Examiner—Peter D. Rosenberg
Attorney, Agent, or Firm—Ladas & Parry

[57] ABSTRACT

The present invention relates to a Weak Pre-Deoxidation Process (abbreviated as W.P.D. process) for producing Al-killed and/or Ti-Killed steel. In this process the proper amount of Si-containing ferro-alloy is added into molten steel during tapping, as Weak Pre-Deoxidation, then the ladle is transferred to Al-Wire feeder system or ladle injection treating equipment to proceed final stage of deoxidation. Not only can the recovery rate of deoxidizer be increased by this new process, but also the cleanliness as well as surface and internal quality of products are effectively improved. Besides, the production cost will be reduced due to less deoxidizer addition, less billet conditioning cost, less rejection and less customer claim. Thus the W.P.D. process is a break-through in present steelmaking practice.

10 Claims, 5 Drawing Sheets

FLOW CHART OF WEAK PRE-DEOXIDATION PROCESS.

TABLE 1. COMPARISON OF FREE OXYGEN CONTENT BEFORE FINAL DEOXIDATION WITH/WITHOUT Si-CONTAINING FERROALLOY ADDITION.

| TYPE OF DEOXIDATION | Si-CONTAINING FERROALLOY ADDED | Si-CONTAINING FERROALLOY NOT ADDED |
|---|---|---|
| FREE OXYGEN (PPM) | 200 | 375 |

TABLE 2. COMPARISON OF TYPICAL CHEMICAL COMPOSITION BETWEEN COLD WORKING USE STEELS. (%)

| | C | Si | Mn | P | S | Al |
|---|---|---|---|---|---|---|
| GENERAL STEEL GRADE | 0.05 | 0.01 | 0.32 | 0.012 | 0.010 | 0.030 |
| DESIGNED STEEL GRADE | 0.05 | 0.01 | 0.32 | 0.012 | 0.010 | 0.012 |

TABLE 3. COMPARISON OF ESTIMATED INDEX OF DEOXIDIZING INCLUSIONS WITH/WITHOUT Si-CONTAINING FERROALLOY ADDITION.

| TYPES OF PRE-DEOXIDATION / TYPES OF INCLUSIONS | Si-CONTAINING FERROALLOY ADDED | Si-CONTAINING FERROALLOY NOT ADDED |
|---|---|---|
| SILICA | 0.21 | 0.29 |
| ALUMINA | 0.23 | 0.48 |

TABLE 4. COMPARISON OF SURFACIAL GRINDING SPEED OF BILLETS WITH/WITHOUT Si-CONTAINING FERROALLOY ADDITION

| Types of Deoxidation / Grinding Situation | Grinding Speed Pieces Hour | Ratio of Grinding Speed |
|---|---|---|
| Si-containing ferroalloy added | 165 | 4.23 |
| Si-containing ferroalloy not added | 39.0 | 1 |

REMARK: DEPTH OF DEFECTS TO BE GROUND ARE MORE THAN 1.2 MM.

TABLE 5. COMPARISON OF QUALITY CHARACTERISTICS WITH/WITHOUT Si-CONTAINING FERROALLOY ADDITION. (TYPICAL)

| Types of Deoxidation / Characteristics | Surfacial Quality *** | Inclusions | Electroplating | Errosion of Dies |
|---|---|---|---|---|
| With Si-containing ferroalloy | O* | O | O | O |
| Without Si-containing ferroalloy | O | Δ** | O | O |

REMARKS: * "O" MEANS GOOD QUALITY

** "Δ" MEANS POOR QUALITY

*** SURFACIAL QUALITY MEANS THE COMPARISON OF RODS AFTER BILLET SURFACE CONDITIONING.

SI CONTAINED FERROALLOY ADDITION AS A WEAK PRE-DEOXIDATION PROCESS IN STEELMAKING

DETAIL DESCRIPTION OF INVENTION

This invention is concerned with Weak Pre-deoxidation practice in steelmaking. By adding Si contained ferroalloy during the tapping stage as a weak pre-deoxidation practice, experience shows this new practice could achieve a lower production cost and high quality steel products.

In producing rimmed steel, little or no addition of deoxidizer results in a higher free oxygen content in molten steel which will react with solute elements in molten steel, consequently, a solid skin layer around the ingot surface is formed.

Such a solid skin layer with good surface quality and soft characteristics is beneficial to cold heading formability whereas the inner part of rimmed steel can not be provided for higher grade application because of its poor cleanliness.

Molten steel with high amount of free oxygen is difficult to cast by continuous caster, while being cast into ingot leads to a lower production yield. Rimmed steel couldn't be provided for special applications for the reasons shown above.

For fully killed steel, the deoxidizer (Al, Si, Ti, Mn) added during tapping is oxidized by the free oxygen in molten steel. The reaction is:

$$xM + y(O) = M_xO_y$$

M: Deoxidizer, Al, Si, Ti, Mn, etc.
(O): free oxygen in molten steel
x,y: coefficients Because lower amount of free oxygen after deoxidizing, the fully filled molten steel can be cast easily by continuous caster. Generally speaking, the production yield and internal quality of continuously cast products is superior than those of ingot. A lower recovery rate and higher additional amount of deoxidizer for fully killed steel causes a higher production cost, and increases the oxide amount in steel. Such a high amount of inclusions are harmful for cold working, while the Weak Pre-deoxidation process can improve the defects stated above and provide steel products with lower cost, higher cleanliness.

For each use of cold working or forming, this grade of steel is fully killed and continuously cast thereby preventing casting incidents and blow hole formation in steel. Thus, Al and/or Ti are the major deoxidizer in continuous casting process. Killed steel for cold working or forming applications can be classified into Al-killed and Ti-Killed steel according to the deoxidizer adopted. For example in Al-Killed steel for reducing work hardening effect, the addition of Si-containing ferroalloy into molten steel should be avoided during steelmaking, only Al is used as deoxidizer. Owing to the deoxidation reaction of Al in molten steel (2Al+3-0=Al$_2$O$_3$), alumina clusters (Al$_2$O$_3$) formed and remained in solid as inclusions. These alumina clusters could not be deformed during deformation, thus deteriorate the cold headability or formability. This new process can overcome the shortness of conventional deoxidation practice, that is, to reduce work hardening effect and/or alumina inclusions. For conventional Al-killed steel, any Si containing ferroalloy could not be added during steelmaking. Such a deoxidation process is modified by the W.P.D. process. During tapping of the top blowing furnace the bottom blowing furnace, the top and the bottom combined blowing furnace or the electric arc furnace, the appropriate amount of Si contained ferroalloy is added into the molten virgin steel. After tapping the free oxygen content in the ladle is reduced to a certain level due to the molten steel being partially killed by the Si-containing ferroalloy.

Then the ladle is transferred to Al-wire feeder system or ladle injection treating station to proceed the final stage deoxidation by Al and/or Ti killing.

After final deoxidation by adding Al and/or Ti, good shrouding system should be adopted during continuous casting or ingot teemming to protect the molten steel from reoxidizing in atmosphere. Consequently, cleaner steel will be obtained by this new process. The explanation of this new process preceeding with various installation is shown in FIG. 1.

Figure 2:
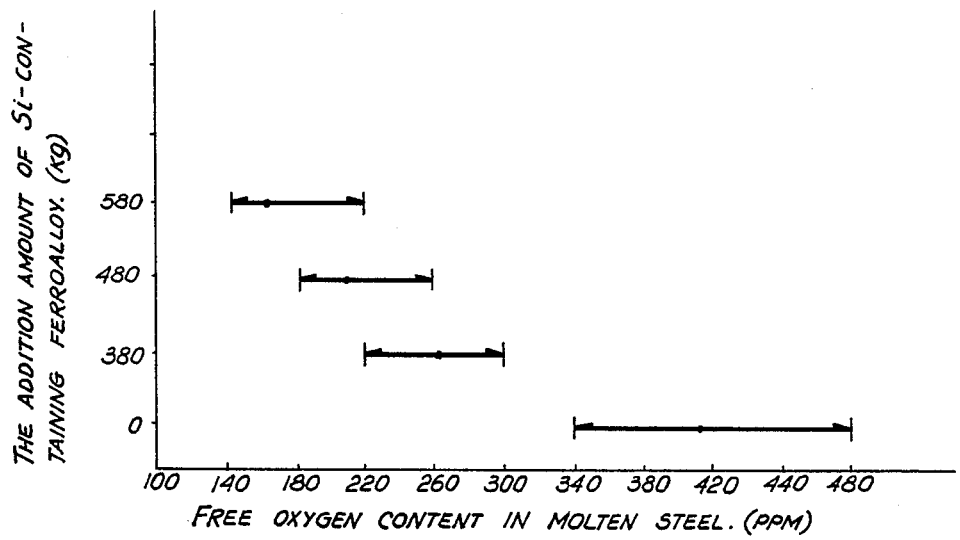

FIG. 2 shows the relationship between the amount of Si contained ferrolloy added and the free oxygen content before adding aluminum as a deoxidizer into the liquid steel (which has no residual Si).

In general, in order to avoid the liquid steel containing residual Di, instead of Si-containing ferroalloy, ferromanganese is added into molten steel to adjust the chemical composition in producing Al-killed steel. But manganese itself is not performed before Al addition in producing Al-killed steel, the residual free oxygen content in the liquid steel will be high and unstable.

FIG. 2 indicates that after being weakly killed by adding the proper amount of Si-containing ferroalloy, the free oxygen content in liquid steel before Al deoxidation is considerably reduced. By using this process, the recovery of deoxidizer is increased and the oxides retained in the liquid steel after deoxidation is reduced as well. Thus the quality of bloom, slab and ingot obtain improvements.

Figure 3A:
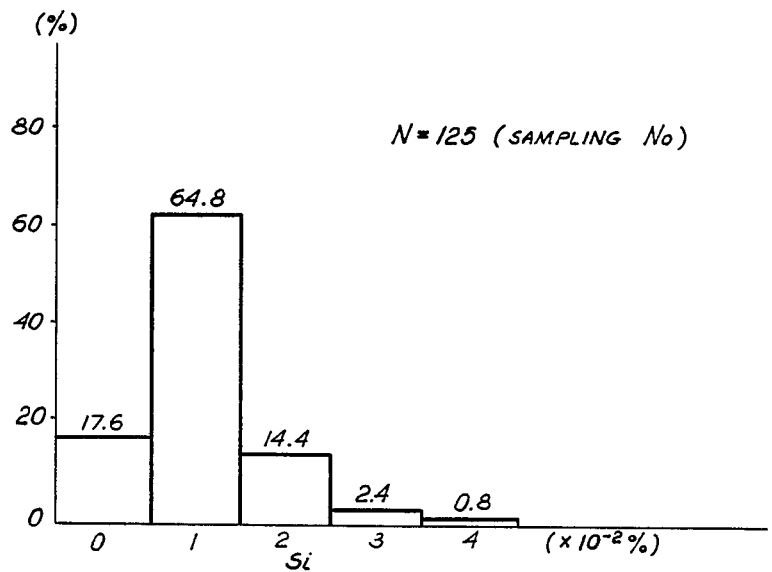
Figure 3B:
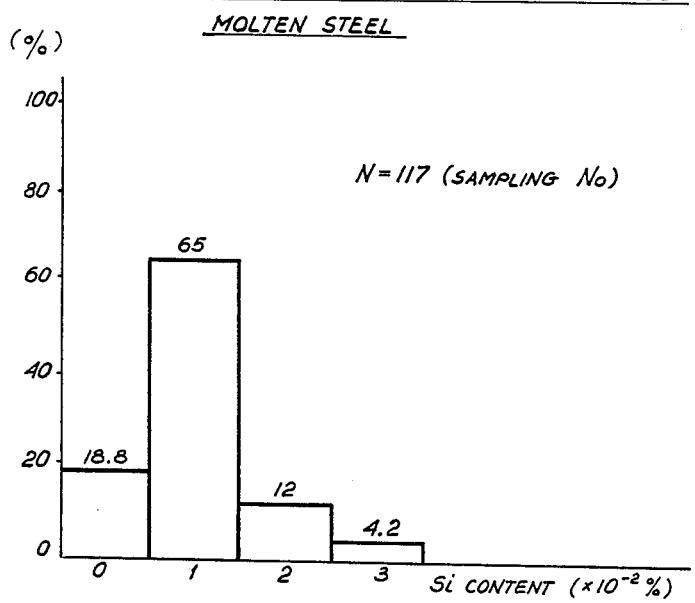

FIGS. 3(a) & 3(b) compare Si contents in the liquid steel between WPD Process and conventional Process. FIG. 3(a) shows the distribution of Si contents in the final molten steel treated by Weak Pre-Deoxidation with Si-containing ferroalloy. FIG. 3(b) shows which do without WPD treatment.

FIGS. 3(a) & 3(b) also show that the percentages of heats processing by WPD Process where the Si content is less than 0.02% is 96.8%. While that of non-WDP Process is 95.8%. This data obviously shows that the proportion of Si content below 0.02% in the liquid steel of WPD Process is higher than that of non-WDP Process. For producing Al-killed steel the Si content analyzed by emission spectrometer is the total amount of Si (including silica), thus confirming that Si-containing ferroalloy will not cause Si to be retained in liquid steel. While Si-containing ferroalloy is added into liquid steel the Si reacts with free oxygen first and forms silicon dioxide (SiO$_2$) particles distributed in whole liquid steel. Manganese, then, reacts with free oxygen around SiO$_2$ and forms Silicon-manganese oxides, which can float up almost completely after gas stirring. Therefore, one of the characteristics of the present invention is by adding a proper amount of Si-containing ferroalloy during tapping, the free oxygen content can be reduced effectively before Al and/or Ti treatment and no Si retained.

Figure 4:
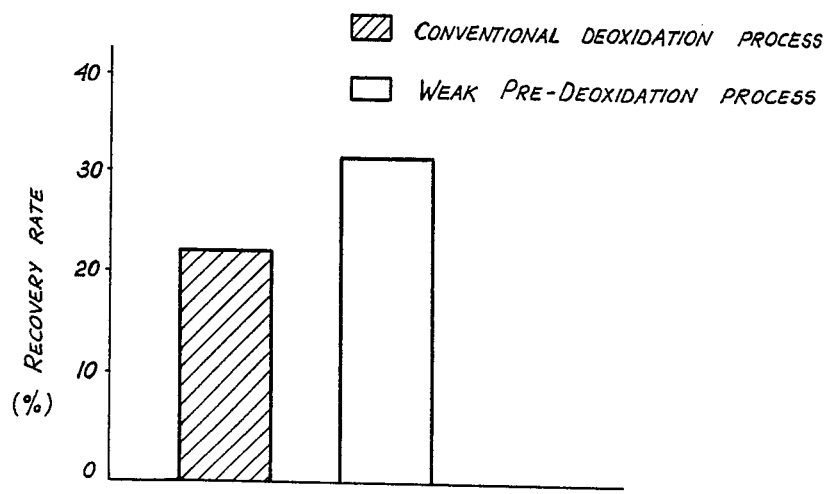

FIG. 4 shows the comparison of the recovery rate of Al between Al-killed steel processed by Weak Pre-Deoxidation Process and conventional deoxidation process. For Al-wire feeder system, the recovery rate of Al is evidently increased if molten steel is treated by WPD process as indicated in FIG. 4. Because of higher recovery rate of Al, resulting in less Al addition, the amount of oxide is relatively reduced. Consequently, the internal cleanliness and surface quality of the steel product was remarkably improved by this new process.

The purpose of this invention is to reduce the free oxygen content of molten steel as low as possible before the addition of deoxidizers aluminum and/or titanium. The key point of this process is to make sure that there is no silicon remaining in the molten steel.

We claim:

1. A method for the deoxidation of molten steel treated in a ladle or furnace by a steelmaking process, consisting essentially of;
   (a) subjecting the produced molten steel to a Weak Pre-Deoxidizing treatment by adding an effective amount of silicon containing ferroalloy to partially deoxidize the molten steel; immediately thereafter,
   (b) treating the partially deoxidized molten steel with one or more deoxidizers and obtaining deoxidized steel without substantial retention of silicon.

2. A method according to claim 1, wherein the produced molten steel is subjected to the Weak Pre-Deoxidizing treatment in the furnace after blowing or before tapping step or during a tapping step of the steel-making process.

3. A method according to claim 2 wherein the molten steel produced by basic oxygen furnace or electric arc furnace steelmaking process is subjected to the Weak Pre-Deoxidizing treatment.

4. A method according to claim 2, wherein the partially deoxidized molten steel is treated with a deoxidizer consisting of one or both of Al or Ti.

5. A method according to claim 2, wherein after the Weak Pre-Deoxidizing treatment, silicon oxides are separated by natural floatation or gas stirring from the partially deoxidized molten steel.

6. A method according to claim 6, wherein after separation of the silicon oxides, the partially deoxidized molten steel is treated with one or both of Al or Ti added by use of an Al wire or shot feeder or ladle injection equipment.

7. A method according to claims 2, wherein the free oxygen content in the partially deoxidized steel is controlled by adjusting the amount of silicon-containing ferroalloy added during the Weak Pre-Deoxidizing treatment.

8. A method according to claim 2, wherein the obtained deoxidized steel is continuously cast or teemming into steel semi-products.

9. A method for the deoxidation of molten steel produced by basic oxygen furnace or electric arc furnace steelmaking process, which method comprises:
   (a) after blowing or before tapping step or during tapping step, subject the produced molten steel to Weak Pre-Deoxidizing treatment by adding an effective amount of silicon-containing ferroalloy to partially deoxidize said molten steel;
   (b) separating silicon oxides from the partially deoxidized molten steel by natural floatation or gas stirring or bubbling in the ladle;
   (c) treating the partially deoxidized, substantially silicon-free molten steel with deoxidizer consisting of one or both of Al or Ti to obtain deoxidized molten steel.

10. A method according to claim 9, wherein the obtained deoxidized molten steel is continuously cast or teeming into semi products capable of being hot rolled, cold rolled, cold worked or formed with the least work-hardening effects.

* * * * *